US012738982B2

(12) United States Patent
Khaira et al.

(10) Patent No.: US 12,738,982 B2
(45) Date of Patent: Sep. 15, 2026

(54) REMOTE CONTROLLED RECONFIGURABLE INTELLIGENT SURFACE

(71) Applicant: Dell Products L.P., Round Rock, TX (US)

(72) Inventors: Navjot Kaur Khaira, Manotick (CA); Tejinder Singh, Manotick (CA); Morris Repeta, Ottawa (CA)

(73) Assignee: Dell Products L.P., Round Rock, TX (US)

(*) Notice: Subject to any disclaimer, the term of this patent is extended or adjusted under 35 U.S.C. 154(b) by 215 days.

(21) Appl. No.: 18/640,596

(22) Filed: Apr. 19, 2024

(65) Prior Publication Data

US 2025/0330214 A1 Oct. 23, 2025

(51) Int. Cl.

| | |
|---|---|
| ***H04J 3/08*** | (2006.01) |
| ***H04B 7/04*** | (2017.01) |
| ***H04W 16/28*** | (2009.01) |

(52) U.S. Cl.

CPC ........ *H04B 7/04013* (2023.05); *H04W 16/28* (2013.01)

(58) Field of Classification Search

CPC ........................... H04B 7/04013; H04W 16/28

See application file for complete search history.

(56) References Cited

U.S. PATENT DOCUMENTS

| | | | |
|---|---|---|---|
| 9,852,079 | B2 | 12/2017 | Kepner et al. |
| 12,512,879 | B2 | 12/2025 | Bai et al. |

(Continued)

FOREIGN PATENT DOCUMENTS

| | | | |
|---|---|---|---|
| CN | 115334521 A | 11/2022 | |
| EP | 3729038 B1 * | 4/2025 | ............... G02B 1/10 |

(Continued)

OTHER PUBLICATIONS

C. Liaskos, S. Nie, A. Tsioliaridou, A. Pitsillides, S. Ioannidis and I. Akyildiz, "End-to-End Wireless Path Deployment With Intelligent Surfaces Using Interpretable Neural Networks," in IEEE Transactions on Communications, vol. 68, No. 11, pp. 6792-6806, Nov. 2020. (Year: 2020).*

(Continued)

*Primary Examiner* — Thai Dinh Hoang

(74) *Attorney, Agent, or Firm* — Amin, Turocy & Watson, LLP

(57) ABSTRACT

The technology described herein is directed towards remotely controlling the direction of a beam reflected from a reconfigurable intelligent surface arranged with a two-dimensional array of unit cells. By controlling a variable tuning device (e.g., varactor diodes) per unit cell, a micro-controller can distinctively adjust the phase of each unit cell, which can be the same phase per column of elements. In one implementation, the reconfigurable intelligent surface is reconfigured to change its beam reflection direction upon receiving a remote control signal (e.g., a five-bit digital code through infrared). The code can be mapped to predefined phase profile data of a group of phase profile data options, that is, to a set of varactor voltages selected from available varactor voltage configurations, which is then applied to the varactors. In this way, the reflected beam can be controlled to reflect an electromagnetic wave (e.g., mmWave) in a specified direction.

20 Claims, 15 Drawing Sheets

(56) References Cited

U.S. PATENT DOCUMENTS

| | | | |
|---|---|---|---|
| 12,609,732 | B2 | 4/2026 | Sahraei et al. |
| 2017/0084306 | A1 | 3/2017 | Xia et al. |
| 2021/0232240 | A1 | 7/2021 | Smith |
| 2022/0377730 | A1 | 11/2022 | Yang et al. |
| 2023/0129288 | A1 | 4/2023 | Sun et al. |
| 2023/0209642 | A1 | 6/2023 | Jiang et al. |
| 2023/0216572 | A1 | 7/2023 | Elshafie et al. |
| 2023/0258759 | A1 | 8/2023 | Wang et al. |
| 2023/0268650 | A1 | 8/2023 | Swartz et al. |
| 2023/0361816 | A1 | 11/2023 | Yang et al. |
| 2023/0370958 | A1 | 11/2023 | Gunzelmann et al. |
| 2024/0056129 | A1 | 2/2024 | Duan et al. |
| 2024/0097743 | A1 | 3/2024 | Bhamri et al. |
| 2024/0337722 | A1 | 10/2024 | Shrivastava et al. |
| 2024/0364434 | A1 | 10/2024 | Sahraei et al. |
| 2024/0365152 | A1 | 10/2024 | Elshafie et al. |
| 2024/0380438 | A1 | 11/2024 | Elshafie et al. |
| 2024/0413868 | A1 | 12/2024 | Haghighat et al. |
| 2025/0138179 | A1 | 5/2025 | Fakhreddine et al. |
| 2025/0150118 | A1 | 5/2025 | Ali et al. |
| 2025/0202563 | A1 | 6/2025 | Elshafie et al. |
| 2025/0323689 | A1 | 10/2025 | Jagyasi et al. |
| 2026/0012227 | A1 | 1/2026 | Albanese et al. |
| 2026/0025168 | A1 | 1/2026 | Huang et al. |
| 2026/0088856 | A1 | 3/2026 | Hemadeh et al. |
| 2026/0113077 | A1 | 4/2026 | Huang et al. |
| 2026/0121692 | A1 | 4/2026 | Huang et al. |
| 2026/0142691 | A1 | 5/2026 | Prasad et al. |
| 2026/0149487 | A1 | 5/2026 | Noh et al. |
| 2026/0163609 | A1 | 6/2026 | Sahraei et al. |
| 2026/0180624 | A1 | 6/2026 | Bae et al. |

FOREIGN PATENT DOCUMENTS

| | | | | | |
|---|---|---|---|---|---|
| JP | 2011-130329 | A | | 6/2011 | |
| KR | 20220125294 | A | * | 9/2022 | ........... H04B 7/0874 |
| WO | 2023/161428 | | | 8/2023 | |
| WO | 2023/230300 | A1 | | 11/2023 | |
| WO | 2024/125781 | A1 | | 6/2024 | |

OTHER PUBLICATIONS

International Search Report and Written Opinion mailed Jan. 24, 2025 for PCT Application No. PCT/US2024/013740, 24 pages.

Sayanskiy Andrey et al: "A 2D-Programmable and Scalable Reconfigurable Intelligent Surface Remotely Controlled via Digital Infrared Code", IEEE Transactions on Antennas and Propagation, vol. 71, No. 1, Jan. 2023, 11 pages.

Kisseleff Steven et al: "Reconfigurable Intelligent Surfaces in Challenging Environments: Underwater, Underground, Industrial and Disaster", IEEE Access, Special Section on Reconfigurable Intelligent Surgace Aided Communications for 6G and Beyond, vol. 9, Nov. 2021, 20 pages.

Y. Zhang, J. Cappos, T.S. Rappaport et al., "Future Internet bandwidth trends: An investigation on current and future disruptive technologies", Secure Systems Lab, Dept. Comput. Sci. Eng., Polytech. Inst. New York Univ., New York, NY, USA, Tech. Rep. TR-CSE-2013-04, Nov. 1, 2013. 27 pages.

M. Poulakis, "Metamaterials Could Solve One of 6G's Big Problems [Industry View]," in Proceedings of the IEEE, vol. 110, No. 9, pp. 1151-1158, Sep. 2022. 8 pages.

L. Subrt and P. Pechac, "Controlling Propagation Environments Using Intelligent Walls," Subrt, L., & Pechac, P. (2012). Controlling propagation environments using Intelligent Walls. 2012 6th European Conference on Antennas and Propagation (EUCAP). doi: 10.1109/eucap.2012.620651. 2012. 5 pages.

N. Kaina, M. Dupre, G. Lerosey, and M. Fink, "Shaping complex microwave fields in reverberating media with binary tunable metasurfaces," Scientific Reports, vol. 4, pp. 1-7, Published: Oct. 21, 2014. 8 pages.

L. Dai, B. Wang, M. Wang et al., "Reconfigurable Intelligent Surface-Based Wireless Communications: Antenna Design, Prototyping, and Experimental Results," in IEEE Access, vol. 8, pp. 45913-45923, Mar. 2, 2020. 11 pages.

Caner Guclu, Julien Perruisseau-Carrier, and Ozlem Aydin Civi. "Proof of Concept of a Dual-Band Circularly-Polarized RF MEMS Beam-Switching Reflectarray" IEEE Transactions on Antennas and Propagation, vol. 60, No. 11, Nov. 2012, 5 pages.

Khaira, et al. "Remote Controlled Reconfigurable Intelligent Surface With Modular Scalable Design for Flexible Radio Coverage With Adjustable Signal Strength", U.S. Appl. No. 18/536,565, filed Dec. 12, 2023, 53 pages.

ETSI GR RIS 001 V1.1.1, "Reconfigurable intelligent surfaces (RIS); Use); Use Cases, Deployment Scenarios and Requirements" Apr. 2023, 29 pages.

ETSI GR RIS 002 V1.1.1, "Reconfigurable intelligent surfaces (RIS); Technological challenges, architecture, and impact on standardization" Aug. 2023, 33 pages.

ETSI GR RIS 003 V1.1.1, "Reconfigurable intelligent surfaces (RIS); Communication Models, Channel Models, Channel estimation and Evaluation Methodology" Jun. 2023, 59 pages.

Invitation to Pay Additional Fees for PCT Application No. PCT/US2024/013740 mailed Sep. 17, 2024, 11 pages.

Lyu et al. "Reconfigurable Intelligent Surface-Assisted Flexible Wireless Network" U.S. Appl. No. 18/758,036, filed Jun. 28, 2024, 36 pages.

Singh et al. "Communication Links Allocation and Slicing of Reconfigurable Intelligent Surface Using Modular Hardware for Flexible Wireless Network" U.S. Appl. No. 18/795,003, filed Aug. 5, 2024, 52 pages.

Non-Final Office Action received for U.S. Appl. No. 18/536,565 dated Feb. 3, 2026, 17 pages.

Non-Final Office Action received for U.S. Appl. No. 18/758,036 dated Nov. 21, 2025, 17 pages.

Notice of Allowance received for U.S. Appl. No. 18/536,565 dated Apr. 14, 2026, 7 pages.

Final Office Action received for U.S. Appl. No. 18/758,036 dated Mar. 2, 2026, 17 pages.

Notice of Allowance received for U.S. Appl. No. 18/758,036 dated Jun. 16, 2026, 31 pages.

Notice of Allowance received for U.S. Appl. No. 18/795,003 dated Jul. 7, 2026, 110 pages.

Notification Concerning Transmittal of International Preliminary Report on Patentability for PCT Application No. PCT/US2024/013740 mailed Jun. 25, 2026, 15 pages.

* cited by examiner

Bias Terminals
404(1,1)
402
412

θ = 10°

Configuration Code: 00010

θ = 20°

Configuration Code: 00100

θ = 40°

Configuration Code: 01000

1
0.8
0.6
0.4
0.2

θ = -45°

Configuration Code: 01010

REMOTE CONTROLLED RECONFIGURABLE INTELLIGENT SURFACE

BACKGROUND

Reconfigurable intelligent surfaces, also called intelligent reflecting surfaces or metasurfaces, refer to artificially designed structures or surfaces that can manipulate electromagnetic waves in a manner that is not achievable using natural materials. These surfaces can be controlled to produce desired changes in the propagation of the waves, such as reflection, refraction, absorption, and polarization. By controlling the reflection and/or refraction of electromagnetic waves, reconfigurable intelligent surfaces can create more favorable propagation environments, improving signal quality and reducing interference by steering wireless signals to desired areas, thereby enhancing the coverage in shadowed or traditionally weak signal zones.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
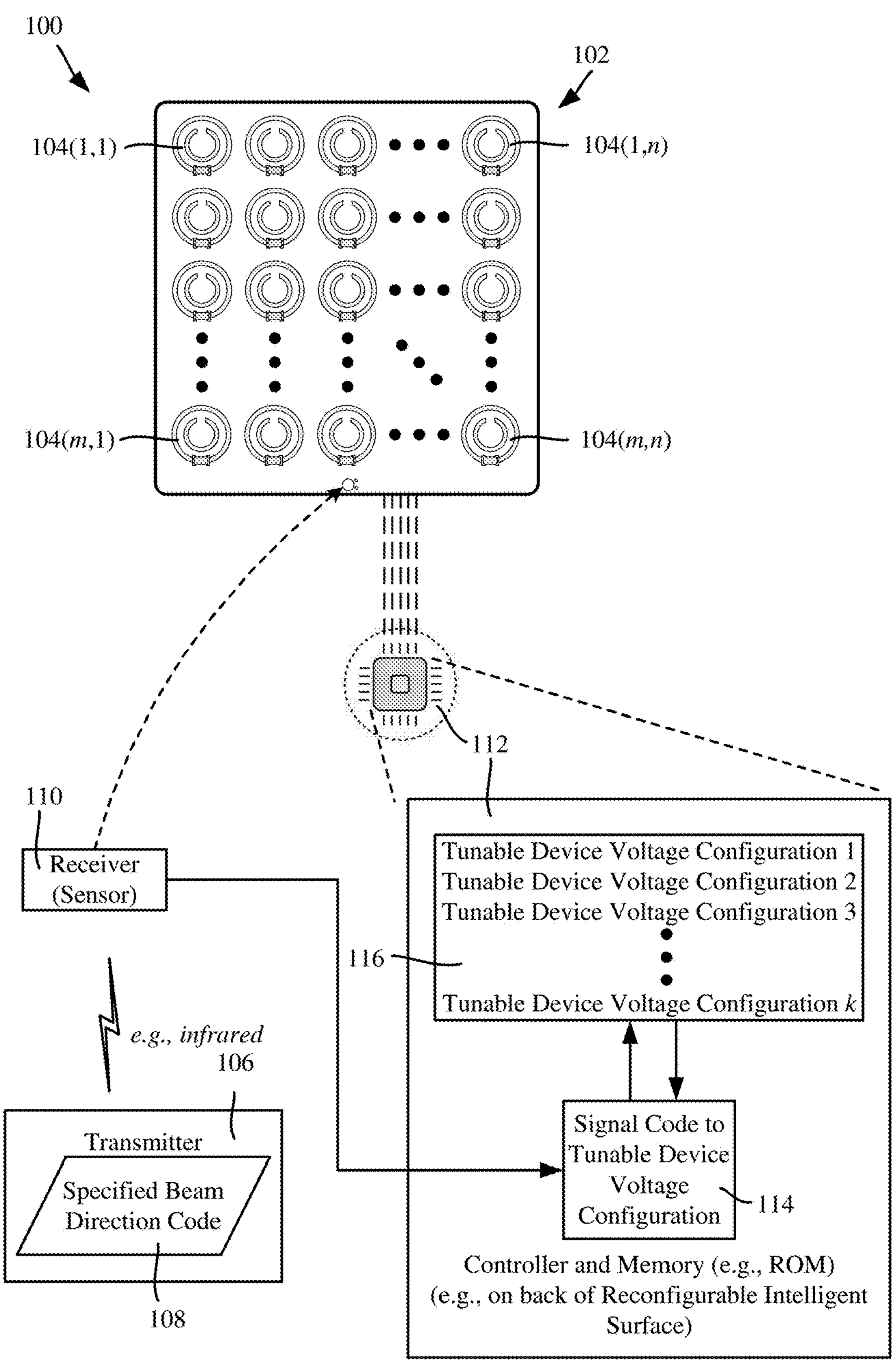
FIG. 1 is a block diagram showing an example system for a remotely controllable reconfigurable intelligent surface, in accordance with various embodiments and implementations of the subject disclosure.

Various embodiments and implementations of the technology described herein are generally directed towards a reconfigurable intelligent surface (RIS, alternatively referred to herein as a metasurface) that is remotely controllable with respect to setting a beam direction of a signal redirected (e.g., reflected) by the reconfigurable intelligent surface. In general, reconfigurable intelligent surfaces need manual reconfiguration when a wireless environment changes or when there is a need to address a new communication challenge. A wireless environment can change rapidly due to various factors, such as user movement, interference from other devices, and physical obstructions. As wireless communication technologies evolve, the requirements from the network will also change.

In one implementation, the reconfigurable intelligent surface is constructed with unit cells (RIS elements), which each have a variable tuning device (e.g., a varactor) that determines its unit cell's phase shift. Together, the phase shifts of the unit cells can be controlled to redirect a beam impinging on the reconfigurable intelligent surface in a specified direction.

Thus, in order to provide reconfigurability in the direction of a reflected signal, the reflected elements are able to be switched between multiple reflection phases, e.g., by the use of a variable tuning device (e.g., a varactor) in each element, which tunes the reflection phase by switching between an element's different capacitance states. Based on a configuration signal, e.g., an infrared code, a controller applies voltages to the varactors, subsequently changing the reconfigurable intelligent surface's phase profile. With an embedded infrared receiver or one coupled to the reconfigurable intelligent surface, the controller coupled to the reconfigurable intelligent surface can decode instructions sent by a (e.g., infrared) transmitter configured for distinct reconfigurable intelligent surface configurations, without the constraints of physical connections.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state.

Further, it is to be understood that the present disclosure will be described in terms of a given illustrative architecture; however, other architectures, structures, substrate materials and process features, and steps can be varied within the scope of the present disclosure.

It will also be understood that when an element such as a layer, region or substrate is referred to as being "on" or "over" another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

FIG. 1 shows a generalized block diagram of an example system 100 including a representation of a reconfigurable intelligent surface 102 that is arranged as an m×n array of unit cells (or elements) 104(1, 1)-104(*m, n*). Each unit cell includes a variable tuning device, such as a varactor, that is controllable to change its phase shift. It is understood that m and n can represent any practical number of elements, possibly (but not limited to) being arranged in columns and rows such that m=n, that is, as a square. Further, as used herein, what is considered a column or row of elements is arbitrary depending on an orientation perspective; applying one voltage to the elements in a given column can be considered applying the same voltage to the elements in a given row if the perspective of viewing the reconfigurable intelligent surface 102 is oriented ninety degrees.

In general, a reconfigurable intelligent surface is typically made from adaptable two-dimensional element arrays, with each element being able to toggle between multiple reflection phases. The precision of the reflected field patterns depends on the size of the aperture and the count of reflective elements, which can be suited to varying communication contexts and settings.

In one example implementation, these reconfigurable intelligent surfaces can be segmented into columns of elements. By employing varactor diodes and a microcontroller that deciphers digital commands from a modulated (e.g., infrared light) signal over the reconfigurable intelligent surface, the phase of any column's elements can be independently adjusted, that is, each element in the column has the same phase in this example implementation. To shape an optimal reflected field design, the reflection phase distribution is calculated and overlaid across the aperture, which is possible by modulating the resonant frequency of individual elements, facilitated by the biasing of a varactor diode or other variable phase tuning device linked to each element. Note that varactor diodes enable a consistent and adjustable phase shift for each element. Alternatively, while PIN diodes simplify the setup, they limit a reconfigurable intelligent surface to a 1-bit configuration, allowing just two reflection phases and resulting in pronounced diffraction spikes in the dispersion pattern. With varactors, a DC circuit is integrated into the design of the reconfigurable intelligent surface to individually bias the varactors in individual elements/cells or groups of cells (e.g., one bias voltage per column). These elements can be manufactured on the front of a multilayer printed circuit board, while the DC circuits, including the biasing pathways and controller, can be positioned on its reverse side.

As described herein, a transmitter 106 transmits control signal data representative of specified beam direction data 108 to a receiver 110. In one implementation, the specified beam direction data 108 corresponds to different configurations of voltage values, such that when a chosen configuration is applied to the unit cells, the phase shifts of the unit cells are determined, which results in the incoming signal being redirected in the specified beam direction. The voltage configurations can be maintained in memory with different received code sequences dictating distinct reconfigurable intelligent surface configurations.

In one implementation, the transmitter 106 is an infrared (IR) device, such as a transceiver comprising an IR transmitter (which sends out signals) and an IR receiver (including a sensor that picks up signals); the transceiver can be implemented in a hand-held or other remote control device. For infrared, an encoded signal, typically a series of pulses and spaces that represent binary data, is transmitted by the transmitter via an IR LED (light emitting diode) in the transmitter, which emits these signals as pulses of infrared light. An IR receiver (e.g., the receiver 110) detects the pulses of IR light from the transmitter 106 and converts them back into electrical signals. It should be noted that for IR signals there needs to be a clear line-of-sight between the remote and the device being controlled; this can be advantageous in many scenarios where remote functionality is desirable (e.g., without having to plug in a cable) and, because infrared does not interfere with any radio channels, where RF signals can be problematic, e.g., picked up by the wrong receiver, subject to intermittent interference and so on. Notwithstanding, any wired or wireless signal transmitter can be used, including RF, BLUETOOTH antennas, and so on, and the technology described herein is not limited to infrared signaling.

The receiver 110 is communicatively coupled to a controller 112, e.g., a microcontroller on the back side of the reconfigurable intelligent surface 102. The controller 112 incorporates (or is coupled to) e.g., nonvolatile memory such as read-only memory (ROM), programmable read-only memory (PROM), flash memory or the like. Note that a programmable memory can have new phase profiles downloaded thereto, such as if a change to the environment occurs for which a new phase profile is more appropriate than any phase profile that is currently being maintained.

Upon obtaining the control signal data, e.g., from the receiver 110 to which the controller 112 is coupled, the controller 112 decodes the signal (block 114), accesses a selected voltage configuration (corresponding to a phase shift profile) from the memory 116 based on the decoded signal value, and applies the voltages of the selected voltage configuration to the tuning elements of the unit cells to adjust the individual phase shifts of each module's individual elements (unit cells) as described herein. Thus, the receiver 110 receives a coded sequence, and the microcontroller 112 extracts the information about the required phase states for the elements based on the coded sequence.

Figure 2A:
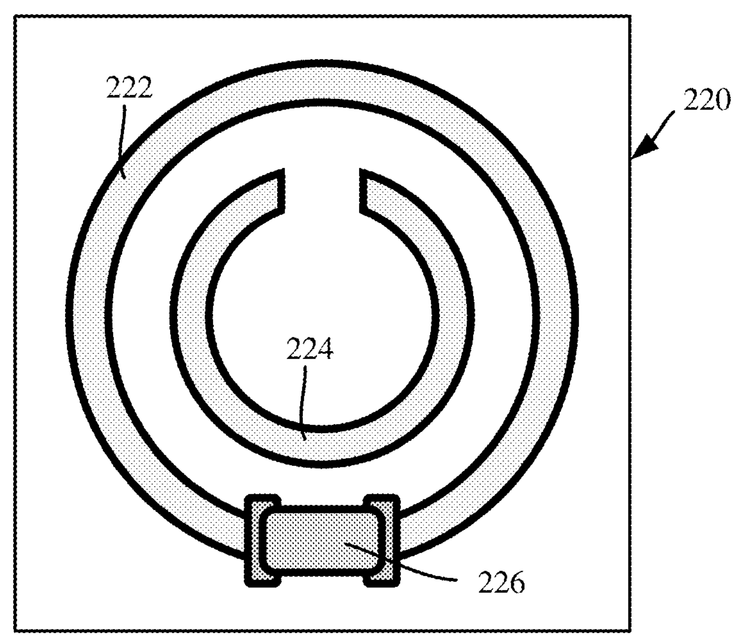
FIGS. 2A and 2B are example top view (FIG. 2A) and three-dimensional perspective top view (FIG. 2B) representations of an example unit cell useable with a reconfigurable intelligent surface, in accordance with various embodiments and implementations of the subject disclosure.
Figure 2B:
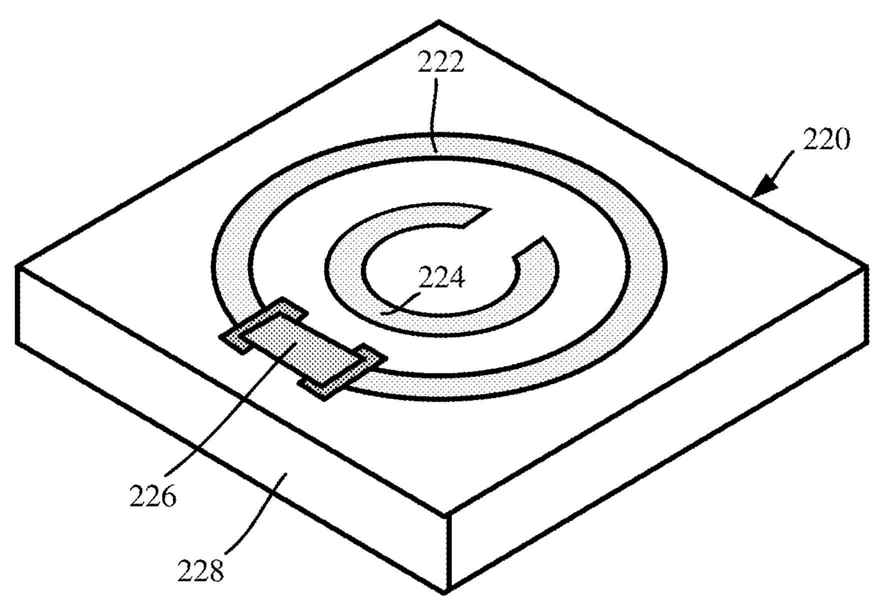

FIGS. 2A and 2B show an example design of a unit cell (or element) that is part of a module, in which a unit cell is a basic building block of the reconfigurable intelligent surface. By understanding and performing controlled adjustment of each unit cell's properties, the system can predict and manage the overall behavior of the reconfigurable intelligent surface.

In the example nonlimiting implementation shown in FIGS. 2A (top view) and 2B (three-dimensional perspective view), one design of the unit cell 220 comprises two circular split rings 222 and 224. The outer ring 222 has a tunable capacitor 226, e.g., an integrated varactor that offers a capacitance that is tunable with voltage. The dimensions of these rings 222 and 224 can be tailored to specific operational frequency ranges for which the unit cell is designed. As is understood, shapes other than circular split rings (e.g., square, rectangular and so on) and other configurations can be used in the construction of a unit cell. These elements can be designed on metallization layer on a (e.g., low-cost) substrate 228 (FIG. 2B). Note that the technology is not limited to a varactor, but can be used with any variable tuning device, (e.g., surface mounted inside the resonating pattern's ring, or integrated into the unit cell), which can be a varactor, a PIN diode, an array of fixed capacitors, an array of fixed inductors, or any other capacitance tuning device with the capability of changing the capacitance of a unit cell designed for operation at a desired resonance frequency. In general, for any device, a change in capacitance of the variable tuning device is determined by bias as applied by the controller 112.

Figure 3:
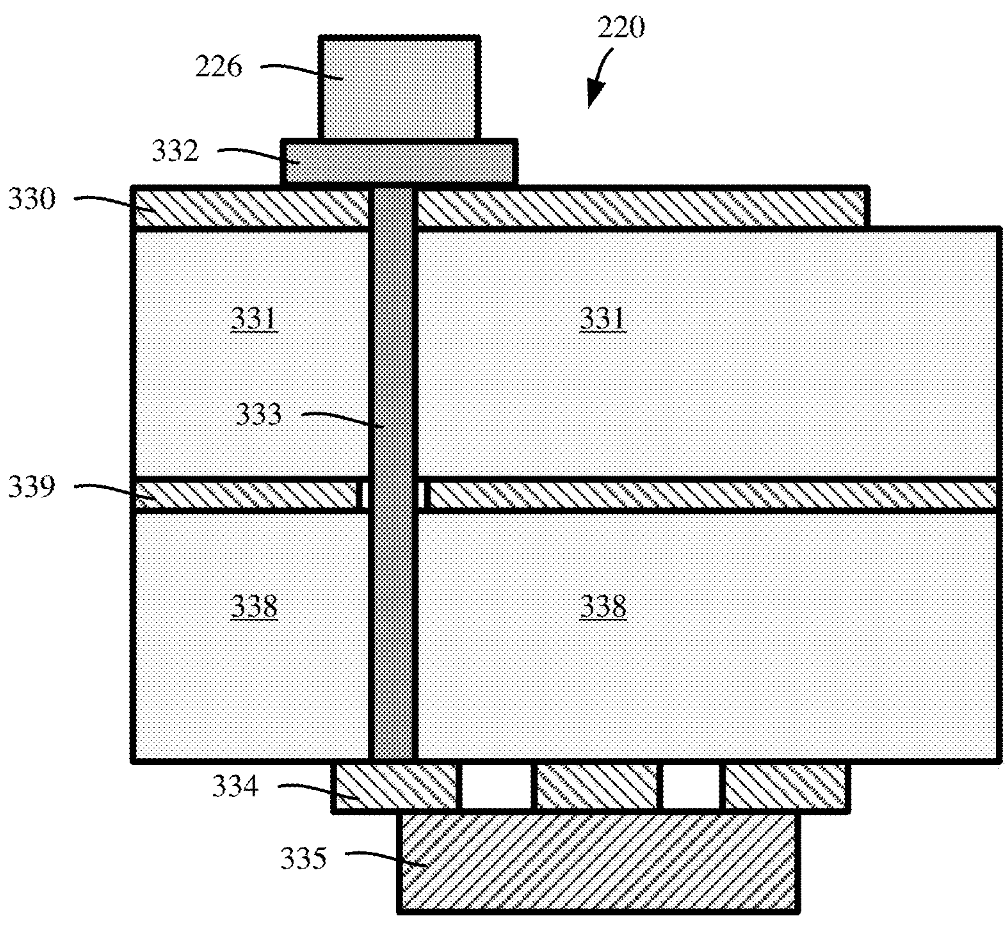
FIG. 3 is a cross-sectional side view of an example unit cell useable with a reconfigurable intelligent surface, showing a stack and arrangement of fabricated layers, in accordance with various embodiments and implementations of the subject disclosure.

FIG. 3 shows a cross-sectional side view of a nonlimiting fabrication layer stack and arrangement of the unit cell 220. A top metallization layer 330 is patterned on a first substrate layer 331. The unit cells/elements are designed on each cell's metallization layer 330. In one example implementation, a surface mounted device (SMD) tunable capacitor 226 can be soldered on top of SMD pads 332 atop the metallization layer 330, with a via 333 (e.g., for voltage control connections of the tunable capacitor 226) to a bottom metallization layer 334 that couples to a microcontroller and power supply controller (PSU)/distribution module 335.

The underside of the first substrate layer 331 is separated from a second substrate layer 338 by a metal plane 339 acting as RF ground. Below the underside of the second substrate layer 338 is the bottom metallization layer 334 which is patterned to form the DC biasing and control circuitry. The controller and the PSU/power distribution module 335 are soldered on this bottom metallization layer 334. To ensure seamless interconnection across the multi-layered stack, the via 333 is strategically positioned. For instance, the tunable capacitor 226 (e.g., varactor) is linked to two vias (only one via 333 is represented in the example of FIG. 3; another via, not explicitly shown, connects the varactor's negative terminal to the ground plane 339, while the other via 333 links its positive terminal to the biasing on the bottom metal layer 334.

Figures 4A, 4B:
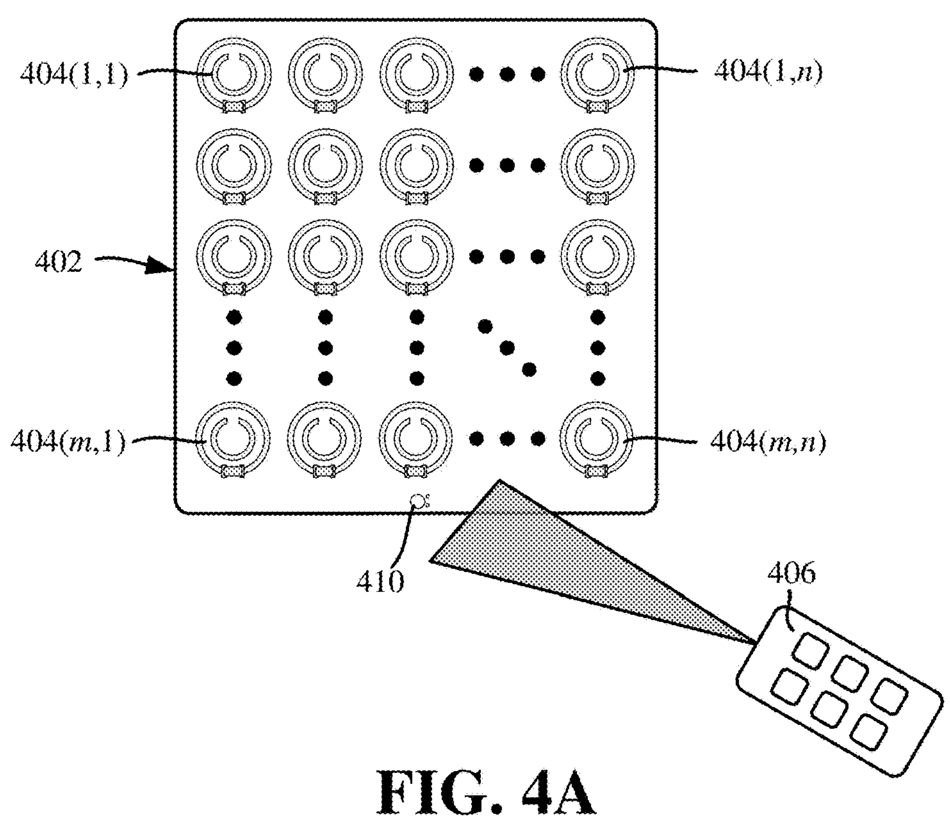
FIG. 4A is a top view of a reconfigurable intelligent surface showing elements and a sensor that obtains signal codes representative of beam reflection directions, in accordance with various embodiments and implementations of the subject disclosure.
FIG. 4B is a bottom view of a reconfigurable intelligent surface showing a controller that controls biases of variable tuning devices corresponding to phase shifts of unit cells, in accordance with various embodiments and implementations of the subject disclosure.

FIG. 4A shows a top view of an example reconfigurable intelligent surface array 402 formed by arranging multiple unit-cells 404(1,1)-404($m,n$) in a two-dimensional m×n array of elements (as in FIG. 1). As can be seen, the top and bottom surface of the reconfigurable intelligent surface array 402, with m number of rows and n number of columns, are represented in FIGS. 4A and 4B, respectively.

The element (unit cell) designs 404(1,1)-404($m,n$), along with the surface mount variable tuning devices (not individually labeled) such as varactors and the (e.g., infrared) receiver 410 can be seen on the front side view of FIG. 4A. The controller 412 and the metal traces/bias terminals (not separately labeled) provide the voltages to the variable tuning devices, as can be seen on the back side view in FIG. 4B of the reconfigurable intelligent surface array 402.

As shown in FIG. 4A, the (e.g., IR) receiver 410 is placed on the top surface of the reconfigurable intelligent surface array 402, which receives signals from the (e.g., IR) transmitter remotely. In one example implementation, this signal includes a five bit digital code, which is received and transferred to the microcontroller 412 at the bottom surface of the reconfigurable intelligent surface array 402 (FIG. 4B). The controller 412 incorporates or is coupled to a memory (e.g., ROM) that decodes the RIS configuration corresponding to the received code sequence, e.g., determines a set of predefined, maintained RIS configuration voltage values corresponding to the code; that is, the voltage combinations of the varactors corresponding to each received signal command can be stored in the memory, e.g., of the controller. The controller 412 then alters the voltage distributed to each of the varactors according to the selected RIS configuration's voltage values, switching the varactors of the elements via the voltages defined therefore between capacitance states as appropriate. To reiterate, the (e.g., surface mount) varactors on the top surface, through two vias per varactor, connect the diodes to the ground and the voltage at the bottom layer, respectively. The controller 412 can either individually control the varactors in the two-dimensional array or can provide a single bias to varactors in the same column, in which case the controller 412 only outputs n voltage signals (or the same voltages to the same rows, which would be m voltage signals).

The direction of the reflected signal from the reconfigurable intelligent surface array 402 is dictated by the phase profile over the reconfigurable intelligent surface array surface, which corresponds to the selected RIS configuration of voltage values. The phase profile corresponds to how much phase shift each element in the reconfigurable intelligent surface array 402 offers, such that the phases combine to reflect the incoming signal in the desired direction, which can be along with a certain gain.

To summarize thus far, described is a multi-bit reconfigurable intelligent surface that offers two-dimensional control using remote signaling, such as infrared light. This reconfigurable intelligent surface system can be remotely adjusted through a digital signal originating from a remote source, with different code sequences determining distinct RIS configurations. Upon receiving the signal code, the receiver guides the attached controller to access from memory and emit driving voltages for the integrated varactors based on preset code sequences. The driving voltage for each varactor controls the reflected phase from each element. For optimal spatial reflection, the phases for each element, corresponding to the driving voltages, are determined and programmed into memory beforehand, e.g., based on phase computations executed using a simulation tool.

In one implementation, signaling can be accomplished through the use of infrared rays to deliver control signals from the remote control to every element coupled to the controller. Control with infrared is appealing because the reflection phase is encoded in a noncontact manner and with high switching speed, i.e., without any physical wire connection for transferring control data. Infrared is particularly beneficial for in-room communications.

Figure 5:
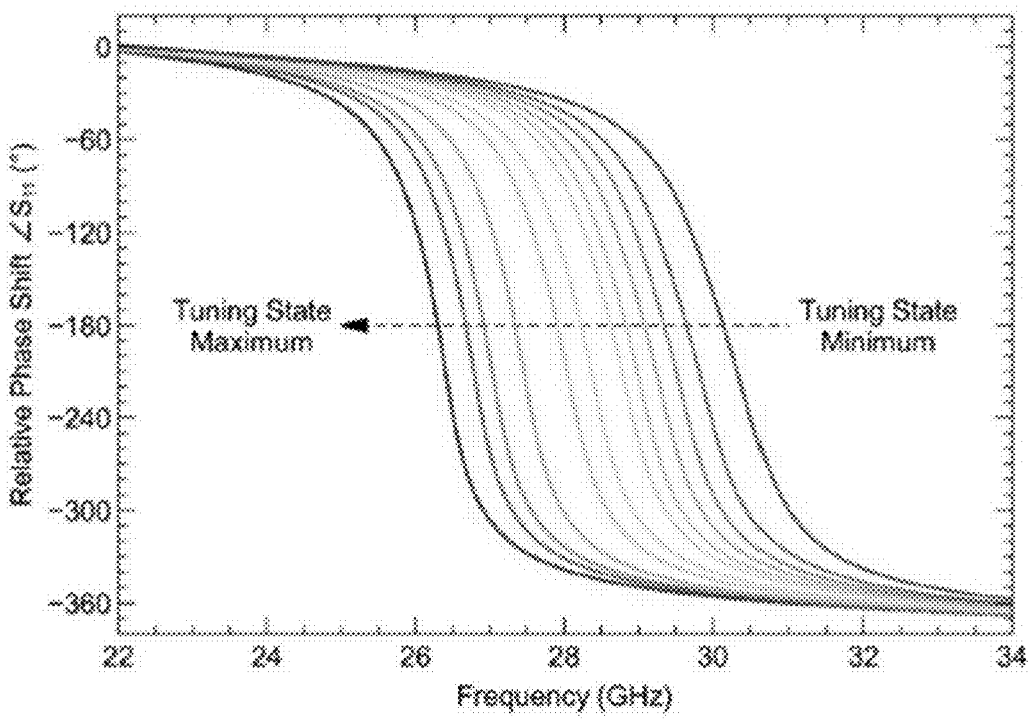
FIG. 5 is a graphical representation of example (simulated) relative phase shifts in a reflected signal around the operational frequency range of 26 GHz-30 GHz with the change in capacitance of a varactor, in accordance with various embodiments and implementations of the subject disclosure.
Figure 6:
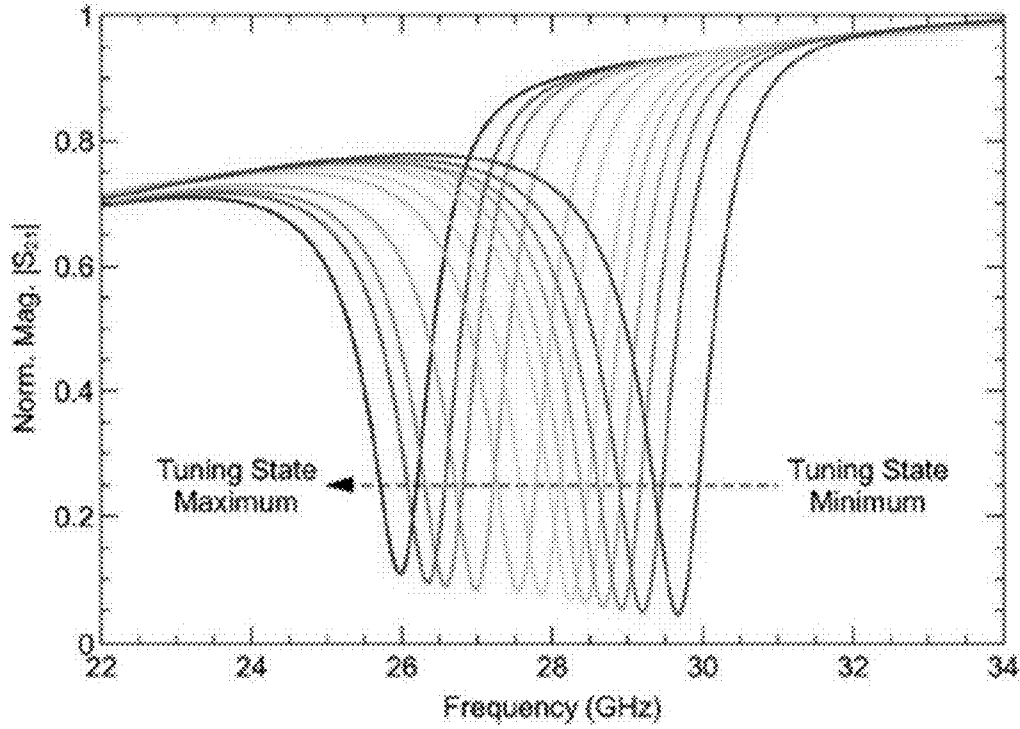
FIG. 6 is a graphical representation of an example (simulated) magnitude of the transmission coefficient (|S21|) showing the shift in resonance frequency with the change in capacitance of the varactor, in accordance with various embodiments and implementations of the subject disclosure.
Figure 7A:
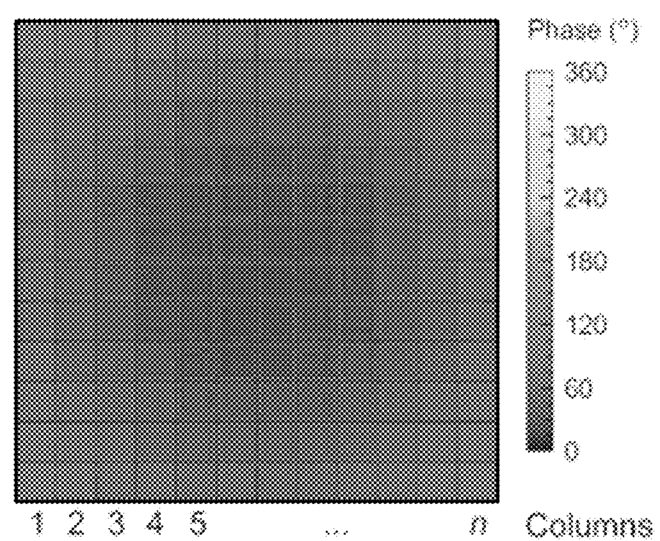
FIGS. 7A and 7B are representations of an example phase profile and corresponding direction of the reflected signal determined based on a first example signal code, in accordance with various embodiments and implementations of the subject disclosure.
Figure 7B:
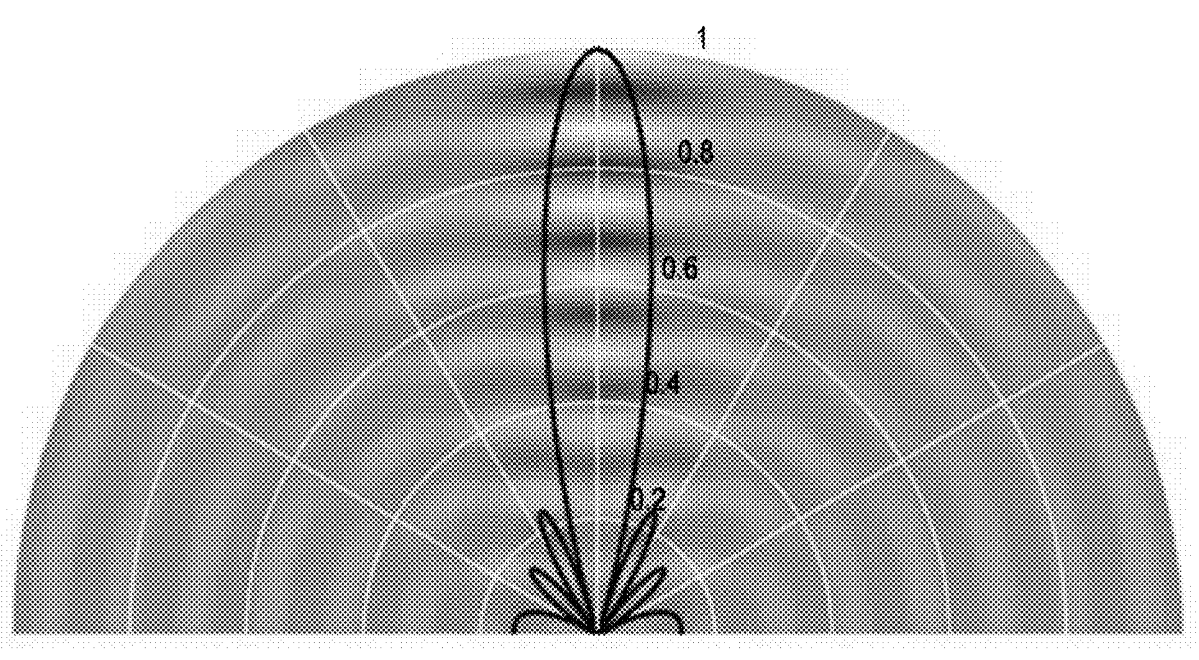
Figure 8A:
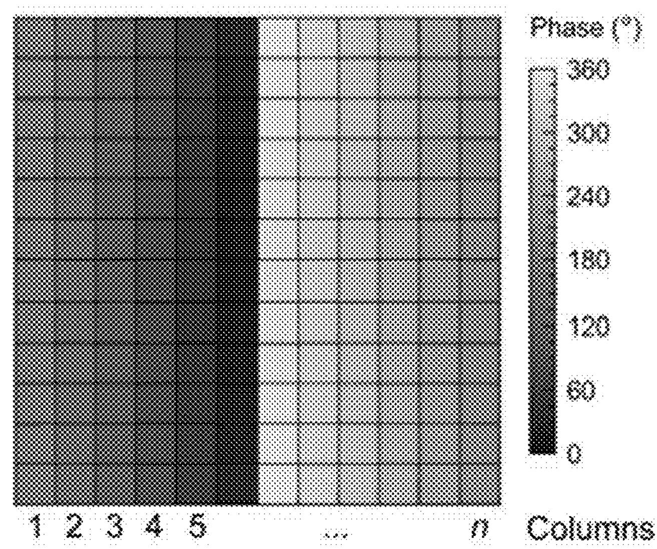
FIGS. 8A and 8B are representations of an example phase profile and corresponding direction of the reflected signal determined based on a second example signal code, in accordance with various embodiments and implementations of the subject disclosure.
Figure 8B:
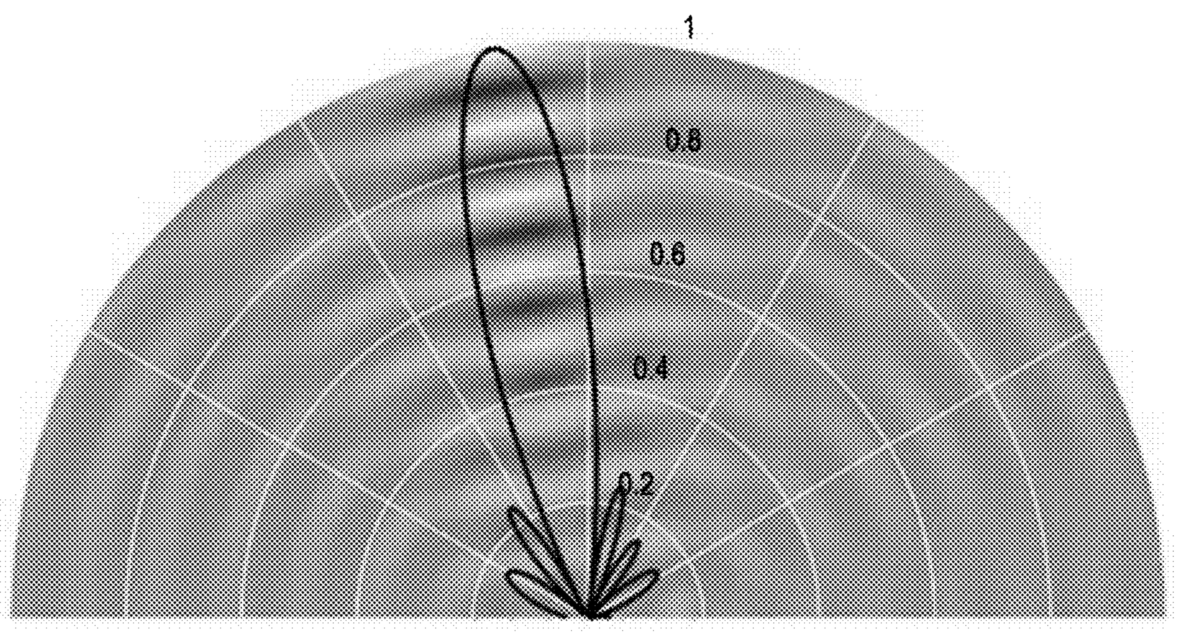
Figure 9A:
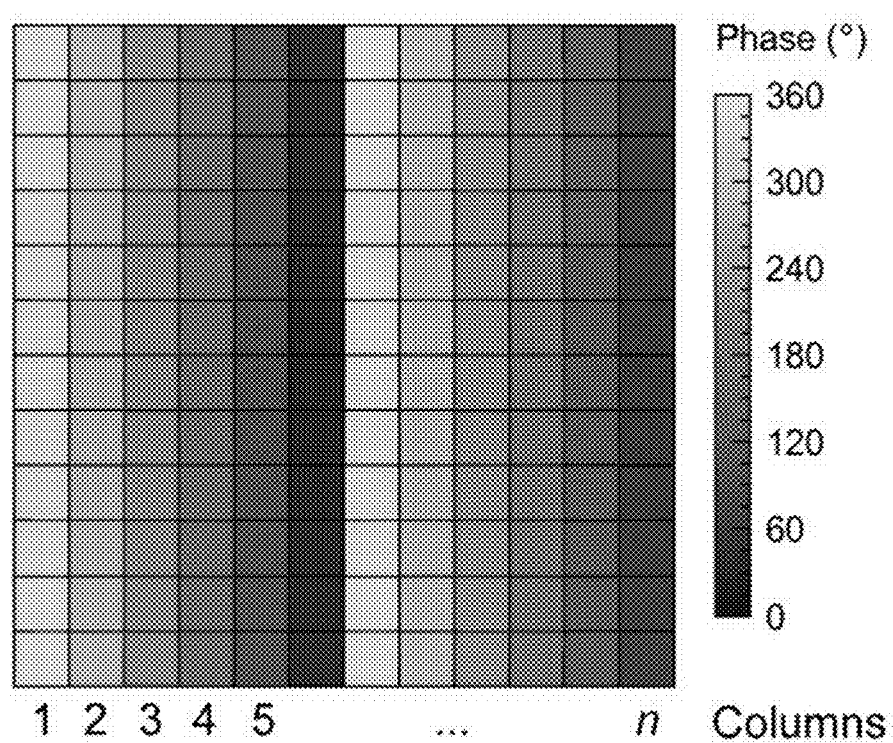
FIGS. 9A and 9B are representations of an example phase profile and corresponding direction of the reflected signal determined based on a third example signal code, in accordance with various embodiments and implementations of the subject disclosure.
Figure 9B:
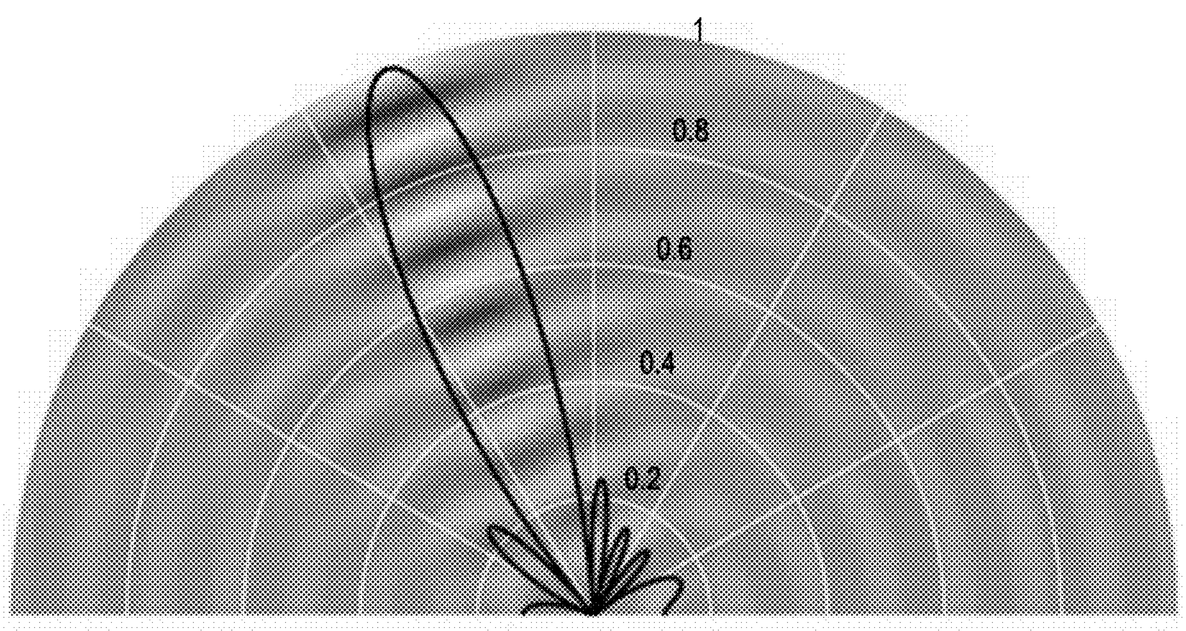
Figure 10A:
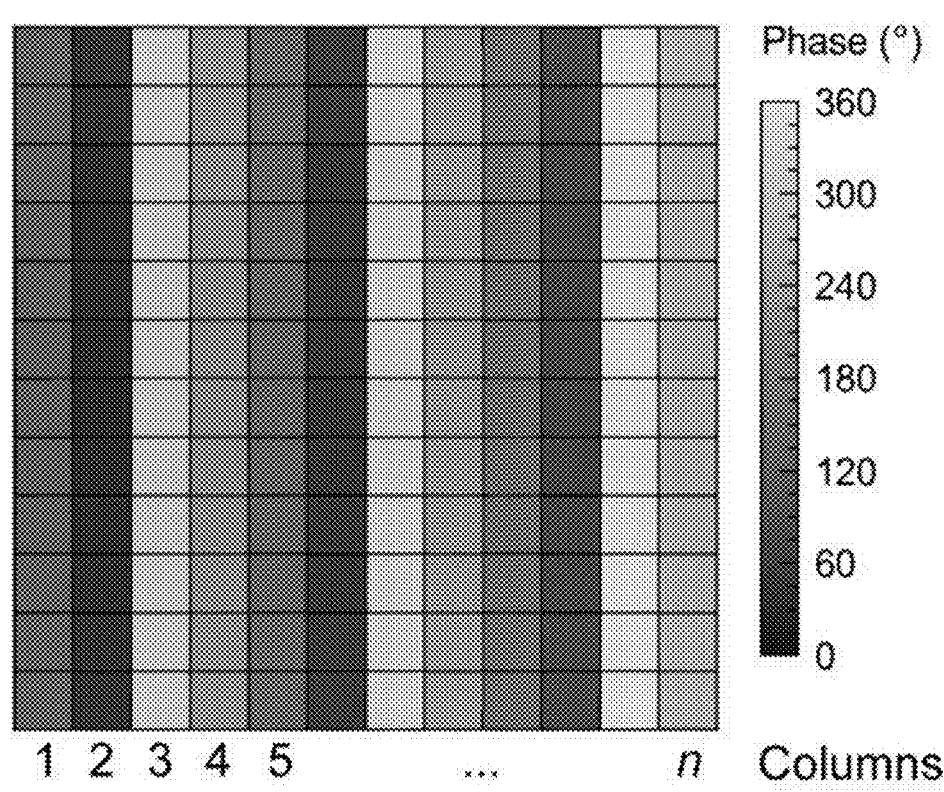
FIGS. 10A and 10B are representations of an example phase profile and corresponding direction of the reflected signal determined based on a fourth example signal code, in accordance with various embodiments and implementations of the subject disclosure.
Figure 10B:
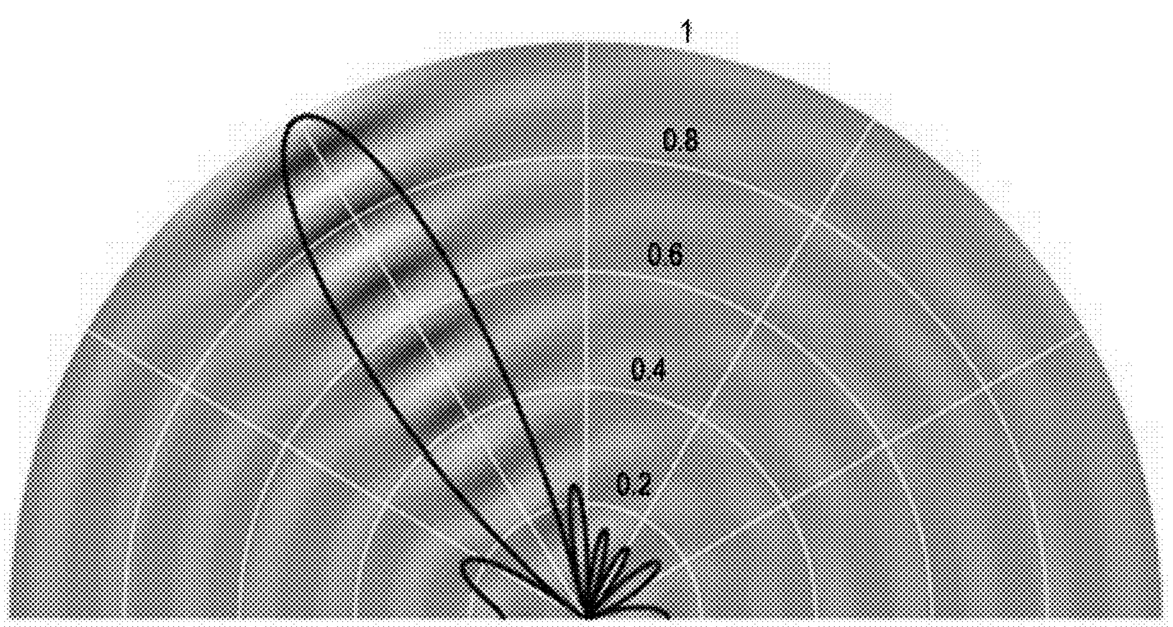
Figure 11A:
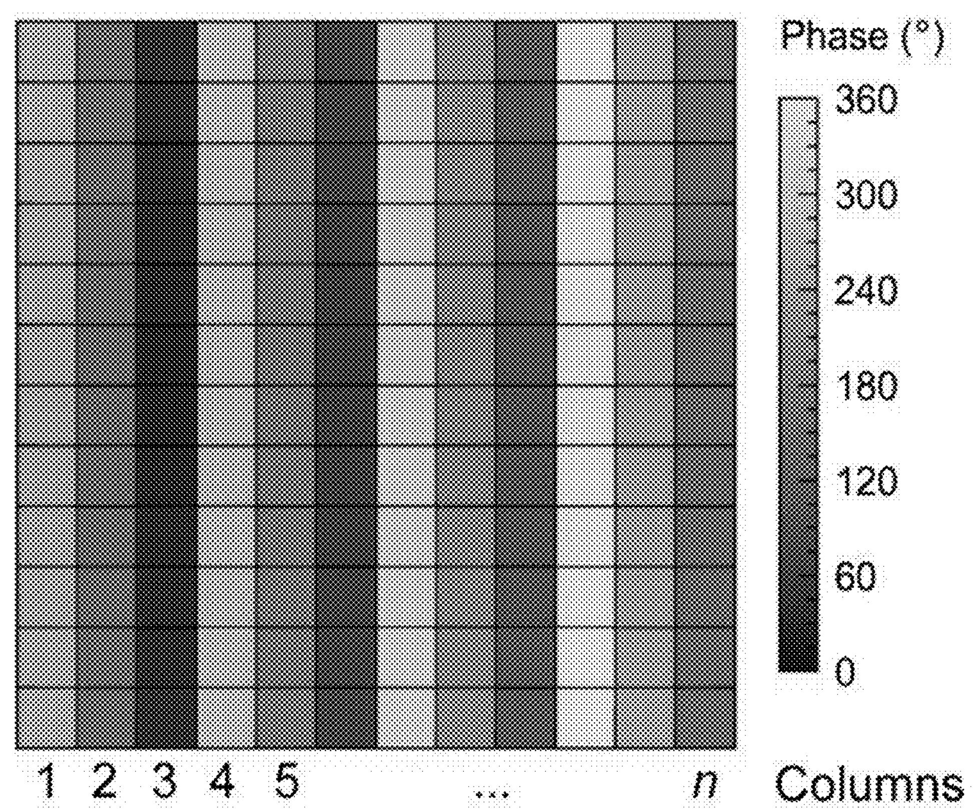
FIGS. 11A and 11B are representations of an example phase profile and corresponding direction of the reflected signal determined based on a fifth example signal code, in accordance with various embodiments and implementations of the subject disclosure.
Figure 11B:
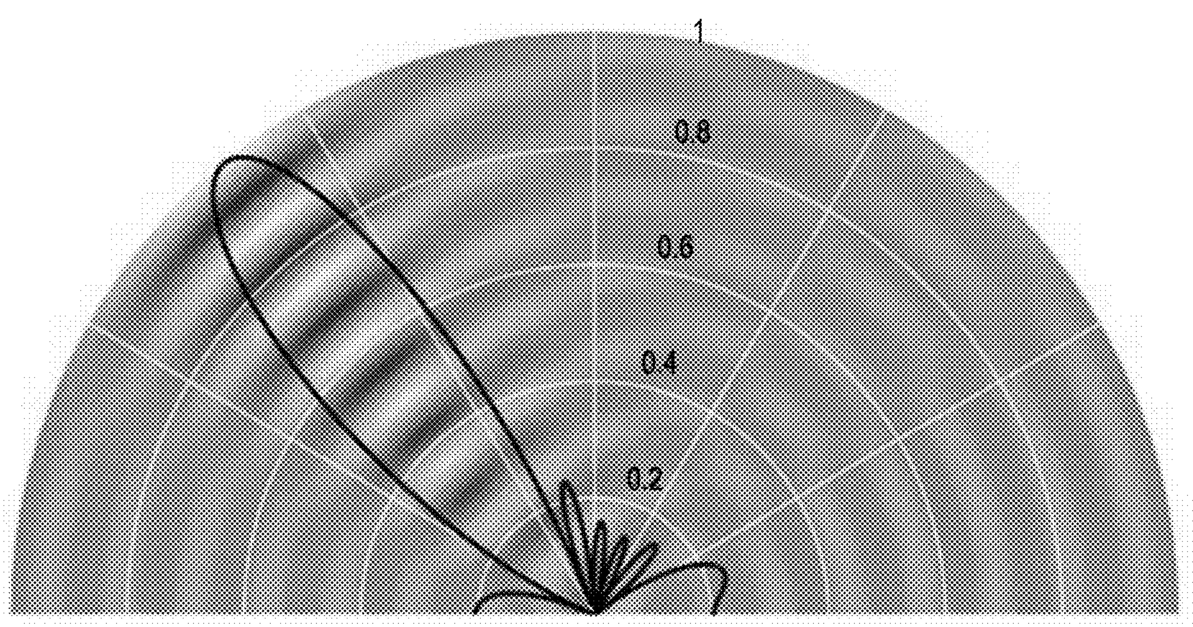

As shown in FIGS. 5 and 6, the performance of individual unit cells can be simulated using an industry standard 3D full-wave EM simulation tool. The way a unit cell reflects and passes on signals determines how the reconfigurable intelligent surface works with electromagnetic waves.

The relative phase shift offered to the reflected signal from the unit cell is shown in FIG. 5, with the minimum tuning state corresponding to the lower end of the capacitance range offered by varactor and the maximum tuning state corresponds to the higher end of the capacitance range of varactor. Similarly, FIG. 6 shows the corresponding shift in resonance frequency for this frequency range, which can be observed via the (normalized $S_{21}$) magnitude of the transmission coefficient. Note that the tunable behavior of the unit cell is shown in the range 26 GHz-32 GHz, however a unit cell can be designed/scaled to operate at another frequency range.

FIGS. 7A-12B show the phase profiles (e.g., FIGS. 7A, 8A and 9A) and corresponding reflection direction (e.g., FIG. 7B) based on various configuration codes. In one example implementation, as shown in FIGS. 7B, 8B and 9B, the binary code 00000 corresponds to a reflected signal in the direction θ=0°, the code 00010 corresponds to reflected signal in the direction θ=10°, and the code 00010 corresponds to reflected signal in in the direction θ=20°. For the states shown below, the controller can effectively provide the same voltage per column, that is, one voltage to the varactors in the first column (1), another voltage (which in these examples can be different from the voltage for column (1), but this is not a requirement) to the varactors in the second column (2), and so on for the n columns.

Figures 12A, 12B:
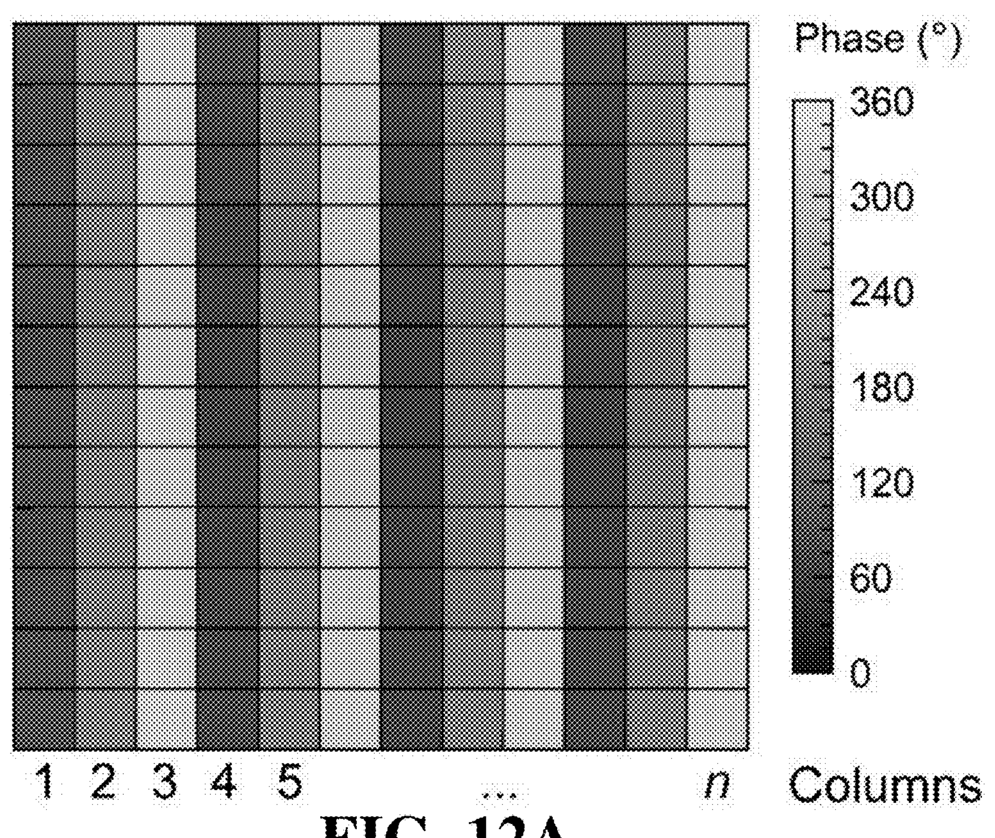
FIGS. 12A and 12B are representations of an example phase profile and corresponding direction of the reflected signal determined based on a sixth example signal code, in accordance with various embodiments and implementations of the subject disclosure.

Continuing with FIGS. 10B-12B in this example implementation, the phase profile data (FIGS. 10A, 11A and 12A) are shown, corresponding to each of their respective configuration codes. Thus, in this example implementation the code 00110 corresponds to reflected signal in the direction θ=30° (FIG. 10B), the code 01000 corresponds to the reflected signal in the direction θ=40° (FIG. 11B), and the code 01010 corresponds to the reflected signal in the direction θ=−45° (FIG. 12B).

Turning to some example usage scenarios, consider that in many scenarios obstructions seriously impede the links between access points (APs) and users. For example, with smart office and home spaces, indoor environments are often cluttered with many obstructions, including walls, furniture, and appliances, which can block or degrade the millimeter wave (mmWave) wireless signals, which are high frequency signals. Reconfigurable intelligent surface panels can be strategically installed on walls, ceilings, or other surfaces/locations, and can be used to reflect and steer directly blocked mmWave signals towards the shadow regions, thereby improving coverage. Thus, a reconfigurable intelligent surface can receive the mmWave signal from the indoor access point and redirect the signal to area(s) where the signal from the router is weak or non-existent.

As described herein, a reconfigurable intelligent surface can be reconfigured remotely using infrared control signals or the like. For example, a technician may determine where to place a reconfigurable intelligent surface, and where the reflected beam is to be directed for a given scenario. The technician can enter a code/use a voice command and/or the like into the remote control, whereby the remote control sends the appropriate control signal to the controller via the receiver, which then reconfigures the reconfigurable intelligent surface accordingly. This configuration can remain in use (e.g., the technician takes the remote control) unless and until a change is deemed to be needed, whereby a technician can return to make the appropriate reconfiguration.

Moreover, the reconfigurable intelligent surface described herein not only improves the coverage but can also be used to improve the security of wireless communications. For example, by selectively directing signals, reconfigurable intelligent surfaces can minimize the possibility of eavesdropping. The passive beamforming from reconfigurable intelligent surface improves energy efficiency by reducing wasteful signal dispersion and directing the signal only where desired. This concept can be easily extended to smart homes where reconfigurable intelligent surface can intelligently steer signals towards connected devices such as smart speakers, smart TVs, IoT (Internet of Things) sensors, and so on, even when these devices are located in hard-to-reach areas.

Figure 13:
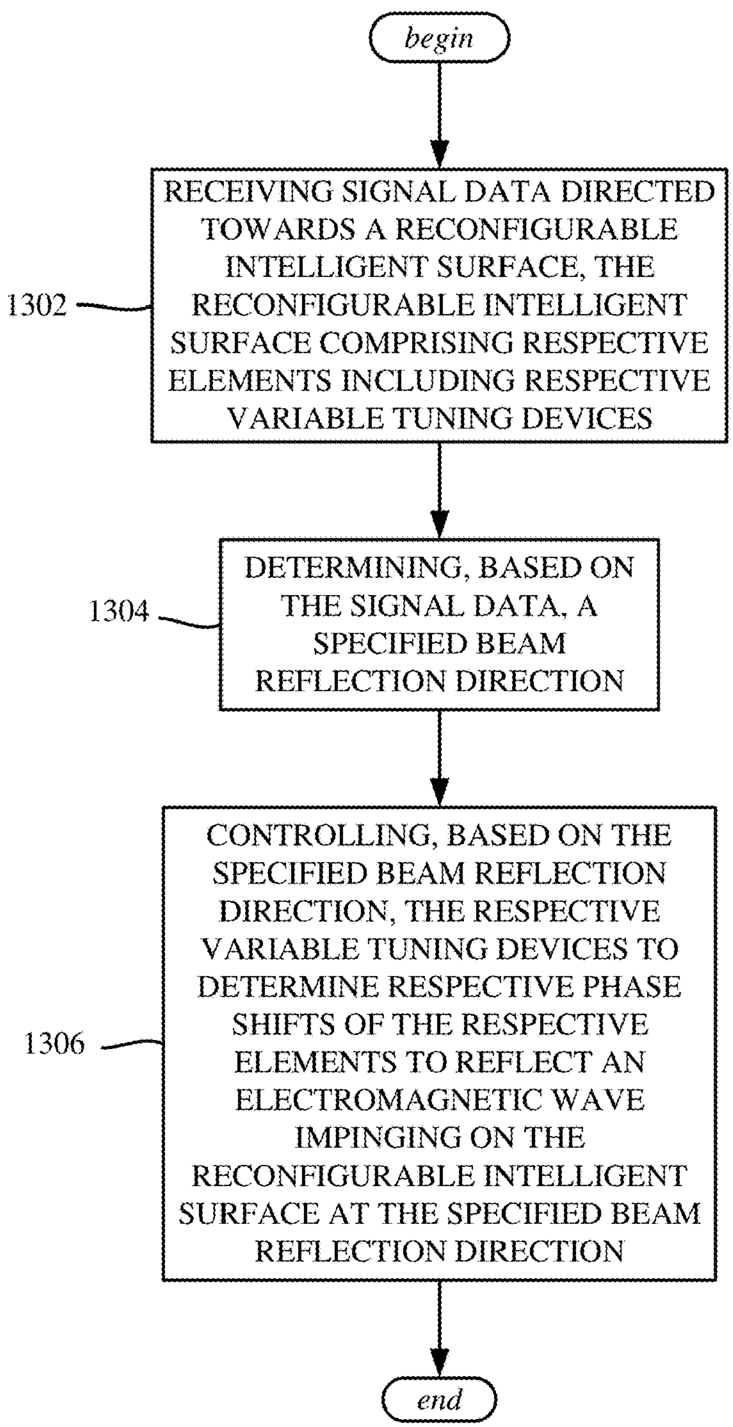
FIG. 13 is a flow diagram showing example operations related to controlling variable tuning devices of a reconfigurable intelligent surface based on signal data corresponding to a specified beam reflection (e.g., maintained in the form of varactor voltages) to reflect an impinging electromagnetic wave, in accordance with various embodiments and implementations of the subject disclosure.

One or more example concepts can be embodied in a system, such as represented in the example operations of FIG. 13, and for example can include at least one memory that stores computer executable components and/or operations, and at least one controller that executes computer executable components and/or operations stored in the at least one memory. Example operations can include operation 1302, which represents receiving signal data directed towards a reconfigurable intelligent surface, the reconfigurable intelligent surface comprising respective elements including respective variable tuning devices. Example operation 1304 represents determining, based on the signal data, a specified beam reflection direction. Example operation 1306 represents controlling, based on the specified beam reflection direction, the respective variable tuning devices to determine respective phase shifts of the respective elements to reflect an electromagnetic wave impinging on the reconfigurable intelligent surface at the specified beam reflection direction.

The respective variable tuning devices can include respective tunable capacitors that are adjustable and usable to control the respective phase shifts of the respective elements.

The respective variable tuning devices can include respective varactors that are voltage-adjustable and usable to control the respective phase shifts of the respective elements of the respective active modules.

The at least one memory can maintain phase profile data usable to set the respective phase shifts; the phase profile data can represent different selectable configurations of the reconfigurable intelligent surface that correspond to different beam reflection directions.

The at least one memory can be incorporated into the at least one controller.

The different selectable configurations can include different groups of respective voltages to apply to the respective variable tuning devices of the respective elements.

The respective elements can be arranged in rows and columns, the columns can be arranged as respective groups of columns, and controlling the respective variable tuning devices can include applying respective voltages to the respective variable tuning devices of the respective groups of columns.

The reconfigurable intelligent surface can be coupled to a signal sensor that receives the signal data. The signal data can be encoded into an infrared signal, and wherein the signal sensor comprises an infrared sensor. The signal data can be encoded into at least one of: a BLUETOOTH signal code, a radio frequency code, or a wired code.

The signal data can include a bit pattern that represents the specified beam reflection direction. The at least one memory can maintain respective different voltage configurations of the reconfigurable intelligent surface that correspond to respective different beam reflection directions, and the bit pattern can represent one of the respective different voltage configurations.

The respective elements can be arranged as respective square arrays on the reconfigurable intelligent surface.

Figure 14:
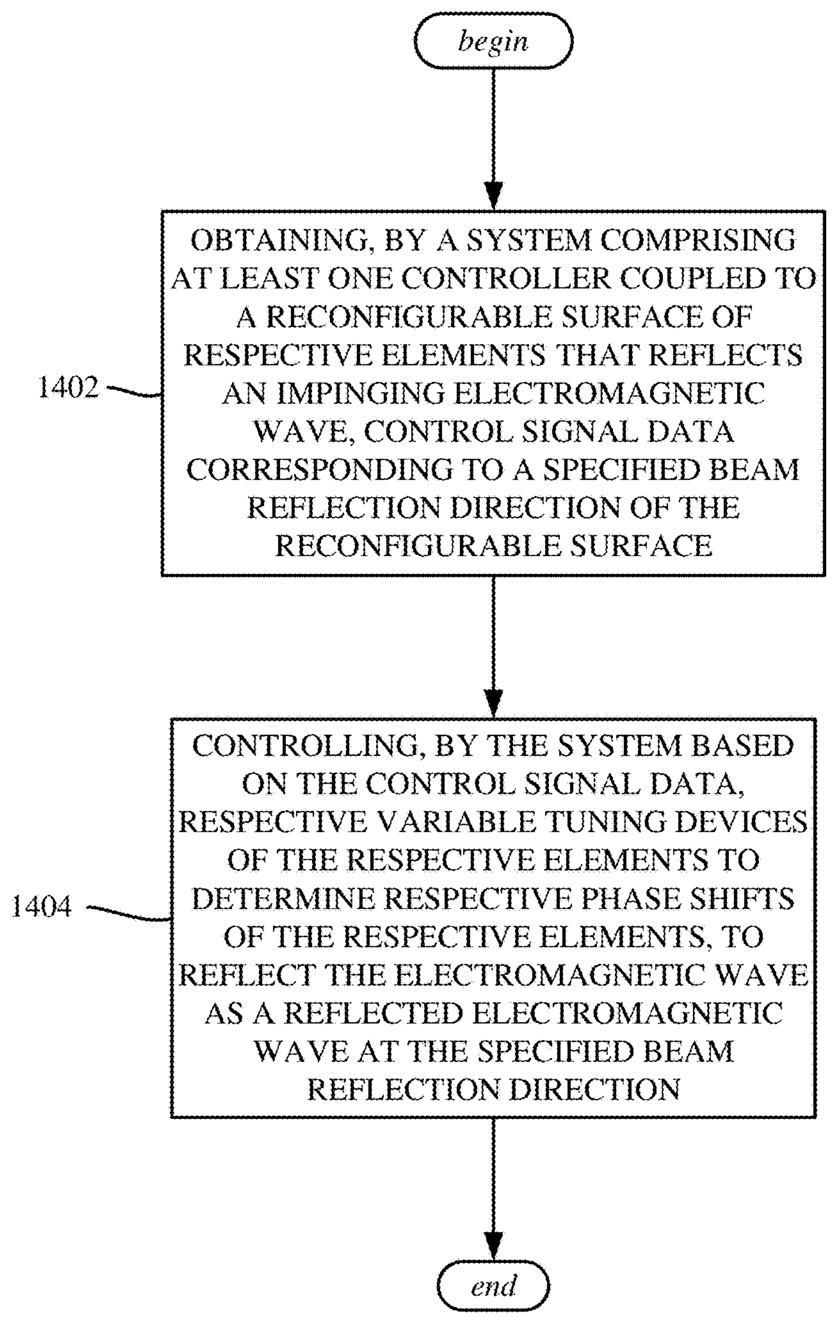
FIG. 14 is a flow diagram showing example operations related to controlling, based on control signal data, variable tuning devices of reconfigurable intelligent surface's elements (unit cells) to determine phase shifts of the elements, to reflect an electromagnetic wave at a specified beam reflection direction, in accordance with various embodiments and implementations of the subject disclosure.

One or more example embodiments and implementations, such as corresponding to example operations of a method, are represented in FIG. 14. Example operation 1402 represents determining, by a system comprising at least one controller coupled to a reconfigurable surface of respective elements that reflects an impinging electromagnetic wave, control signal data corresponding to a specified beam reflection direction of the reconfigurable surface. Example operation 1404 represents controlling, by the system based on the control signal data, respective variable tuning devices of the respective elements to determine respective phase shifts of the respective elements, to reflect the electromagnetic wave as a reflected electromagnetic wave at the specified beam reflection direction.

The control signal data can represent a defined bit pattern of a group of defined bit patterns, and further operations can include selecting, by the system based on the defined bit pattern, respective values corresponding to the respective phase shifts.

Further operations can include selecting, by the system based on the control signal data, respective voltages corresponding to the respective phase shifts; the controlling of the respective variable tuning devices can include applying the respective voltages to the respective tunable variable devices.

The respective elements can be arranged as an array of respective rows and respective columns, and further operations can include selecting, by the system based on the control signal data, respective subgroups of voltages corresponding to the respective phase shifts; the controlling of the respective variable tuning devices can include applying the respective subgroups of the respective voltages to the respective variable tuning devices in the respective columns.

Figure 15:
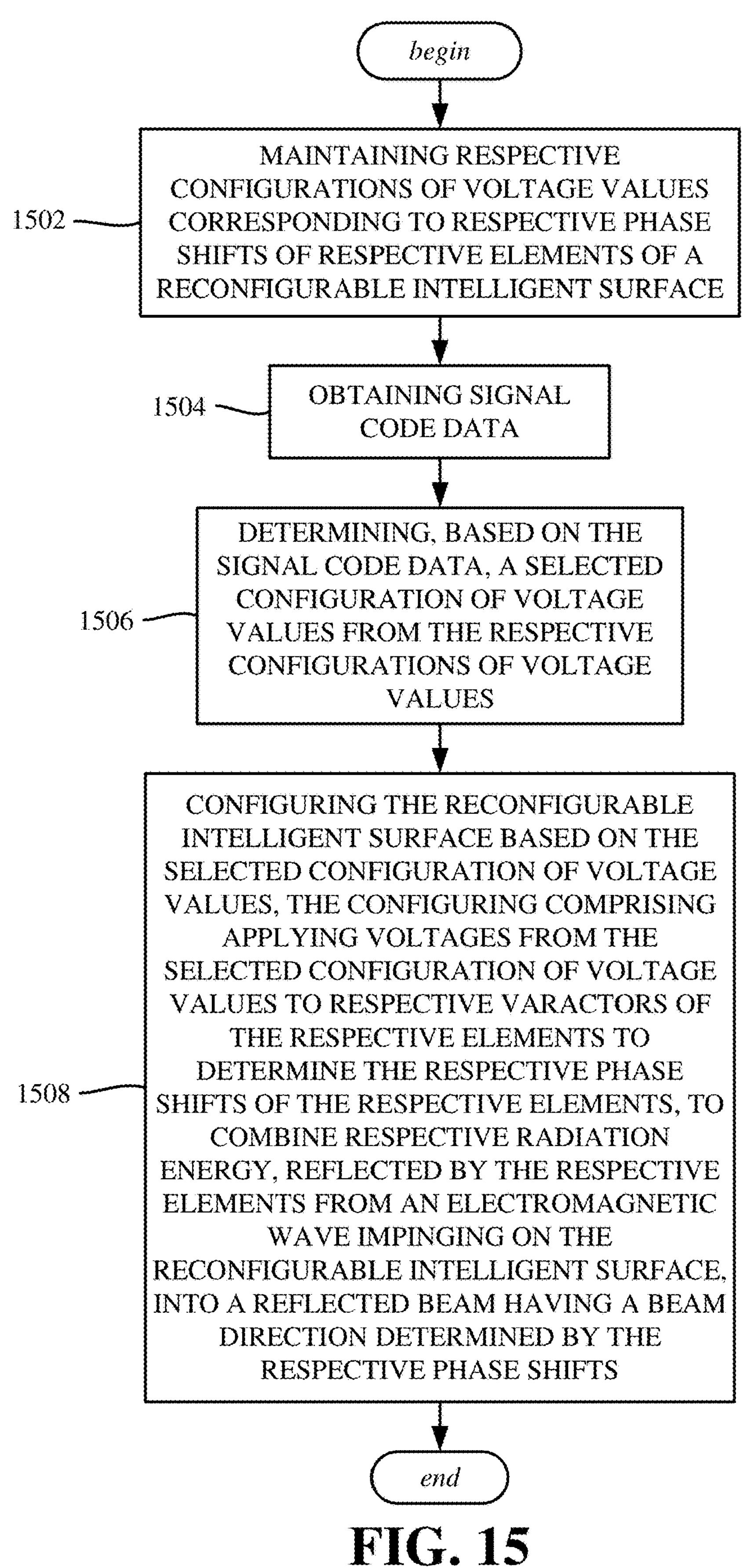
FIG. 15 is a flow diagram showing example operations related to configuring a reconfigurable intelligent surface by applying voltages to varactors obtained from a configuration of voltage values that is selected based on signal code data, in accordance with various embodiments and implementations of the subject disclosure.

FIG. 15 summarizes various example operations, e.g., corresponding to a machine-readable medium, comprising executable instructions that, when executed by at least one processor, facilitate performance of operations. Example operation 1502 represents maintaining respective configurations of voltage values corresponding to respective phase shifts of respective elements of a reconfigurable intelligent surface. Example operation 1504 represents obtaining signal code data. Example operation 1506 represents determining, based on the signal code data, a selected configuration of voltage values from the respective configurations of voltage values. Example operation 1808 represents configuring the reconfigurable intelligent surface based on the selected configuration of voltage values, the configuring comprising applying voltages from the selected configuration of voltage values to respective varactors of the respective elements to determine the respective phase shifts of the respective elements, to combine respective radiation energy, reflected by the respective elements from an electromagnetic wave impinging on the reconfigurable intelligent surface, into a reflected beam having a beam direction determined by the respective phase shifts.

The respective elements can be arranged as columns and rows, and applying the voltages from the selected configuration of voltage values can include applying a respective voltage per respective row of the respective elements.

Obtaining the signal code data can include receiving the signal code data encoded into at least one of: an infrared signal, a radio frequency signal, or a wired signal.

As can be seen, the technology described herein facilitates customizable reconfigurable intelligent surface configurations, via remote control of reflected beam direction. Reconfigurable intelligent surface configurations can be changed by using a control signal (e.g., a binary sequence) transmitted by an infrared transmitter and received by infrared receiver(s) and overseen by the controller. Upon detecting the control signal, the controller obtains and outputs the driving voltages for the variable tuning devices, whereby the phase profile on the reconfigurable intelligent surface and the resulting reflected beam direction can be controlled remotely.

The remotely controlled reconfigurable intelligent surface described herein can be dynamically adapted to better optimize wireless communications in various scenarios. Remotely controlled reconfigurable intelligent surface can be deployed in hard-to-reach or inaccessible locations, without the requirement for frequent physical intervention. By remotely tuning the reconfigurable intelligent surface, the technology described herein can improve received signal strength, reduce interference, and enhance the overall quality of service. For advanced wireless applications, such as the Internet of Things (IoT), the remote control capability can contribute to building a responsive network directed to the varied demands of such applications. As described herein, the reconfigurable intelligent surfaces can be updated or reconfigured as needed, ensuring that they remain relevant and effective in future scenarios.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "controller" or "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one controller; and at least one memory that stores executable instructions that, when executed by the at least one controller, facilitate performance of operations, the operations comprising:

receiving signal data directed towards a reconfigurable intelligent surface, the reconfigurable intelligent surface comprising respective elements including respective variable tuning devices;

determining, based on the signal data, a specified beam reflection direction; and controlling, based on the specified beam reflection direction, the respective variable tuning devices to determine respective phase shifts of the respective elements to reflect an electromagnetic wave impinging on the reconfigurable intelligent surface at the specified beam reflection direction.

2. The system of claim 1, wherein the respective variable tuning devices comprise respective tunable capacitors that are adjustable and usable to control the respective phase shifts of the respective elements.

3. The system of claim 1, wherein the respective variable tuning devices comprise respective varactors that are voltage-adjustable and usable to control the respective phase shifts of the respective elements of the respective active modules.

4. The system of claim 1, wherein the at least one memory maintains phase profile data usable to set the respective phase shifts, the phase profile data representing different selectable configurations of the reconfigurable intelligent surface that correspond to different beam reflection directions.

5. The system of claim 4, wherein the at least one memory is incorporated into the at least one controller.

6. The system of claim 1, wherein the different selectable configurations comprise different groups of respective voltages to apply to the respective variable tuning devices of the respective elements.

7. The system of claim 1, wherein the respective elements are arranged in rows and columns, wherein the columns are arranged as respective groups of columns, and wherein the controlling of the respective variable tuning devices comprises applying respective voltages to the respective variable tuning devices of the respective groups of columns.

8. The system of claim 1, wherein the reconfigurable intelligent surface is coupled to a signal sensor that receives the signal data.

9. The system of claim 8, wherein the signal data is encoded into an infrared signal, and wherein the signal sensor comprises an infrared sensor.

10. The system of claim 8, wherein the signal data is encoded into at least one of: a BLUETOOTH signal code, a radio frequency code, or a wired code.

11. The system of claim 1, wherein the signal data comprises a bit pattern that represents the specified beam reflection direction.

12. The system of claim 11, wherein the at least one memory maintains respective different voltage configurations of the reconfigurable intelligent surface that correspond to respective different beam reflection directions, and wherein the bit pattern represents one of the respective different voltage configurations.

13. The system of claim 1, wherein the respective elements are arranged as respective square arrays on the reconfigurable intelligent surface.

14. A method, comprising:

obtaining, by a system comprising at least one controller coupled to a reconfigurable surface of respective elements that reflects an impinging electromagnetic wave, control signal data corresponding to a specified beam reflection direction of the reconfigurable surface; and controlling, by the system based on the control signal data, respective variable tuning devices of the respective elements to determine respective phase shifts of the respective elements, to reflect the electromagnetic wave as a reflected electromagnetic wave at the specified beam reflection direction.

15. The method of claim 14, wherein the control signal data represents a defined bit pattern of a group of defined bit patterns, and further comprising selecting, by the system based on the defined bit pattern, respective values corresponding to the respective phase shifts.

16. The method of claim 14, further comprising selecting, by the system based on the control signal data, respective voltages corresponding to the respective phase shifts, wherein the controlling of the respective variable tuning devices comprises applying the respective voltages to the respective tunable variable devices.

17. The method of claim 14, wherein the respective elements are arranged as an array of respective rows and respective columns, and further comprising selecting, by the system based on the control signal data, respective subgroups of voltages corresponding to the respective phase shifts, wherein the controlling of the respective variable tuning devices comprises applying the respective subgroups of the respective voltages to the respective variable tuning devices in the respective columns.

18. A non-transitory machine-readable medium, comprising executable instructions that, when executed by at least one processor, facilitate performance of operations, the operations comprising:

maintaining respective configurations of voltage values corresponding to respective phase shifts of respective elements of a reconfigurable intelligent surface;

obtaining signal code data;

determining, based on the signal code data, a selected configuration of voltage values from the respective configurations of voltage values; and configuring the reconfigurable intelligent surface based on the selected configuration of voltage values, the configuring comprising applying voltages from the selected configuration of voltage values to respective varactors of the respective elements to determine the respective phase shifts of the respective elements, to combine respective radiation energy, reflected by the respective elements from an electromagnetic wave impinging on the reconfigurable intelligent surface, into a reflected beam having a beam direction determined by the respective phase shifts.

19. The non-transitory machine-readable medium of claim 18, wherein the respective elements are arranged as columns and rows, and wherein the applying of the voltages from the selected configuration of voltage values comprises applying a respective voltage per respective row of the respective elements.

20. The non-transitory machine-readable medium of claim 17, wherein the obtaining of the signal code data comprises receiving the signal code data encoded into at least one of: an infrared signal, a radio frequency signal, or a wired signal.

* * * * *